Feb. 25, 1964  C. W. NOLAN  3,121,963
SHOVELING DEVICE
Filed April 16, 1962  2 Sheets-Sheet 2
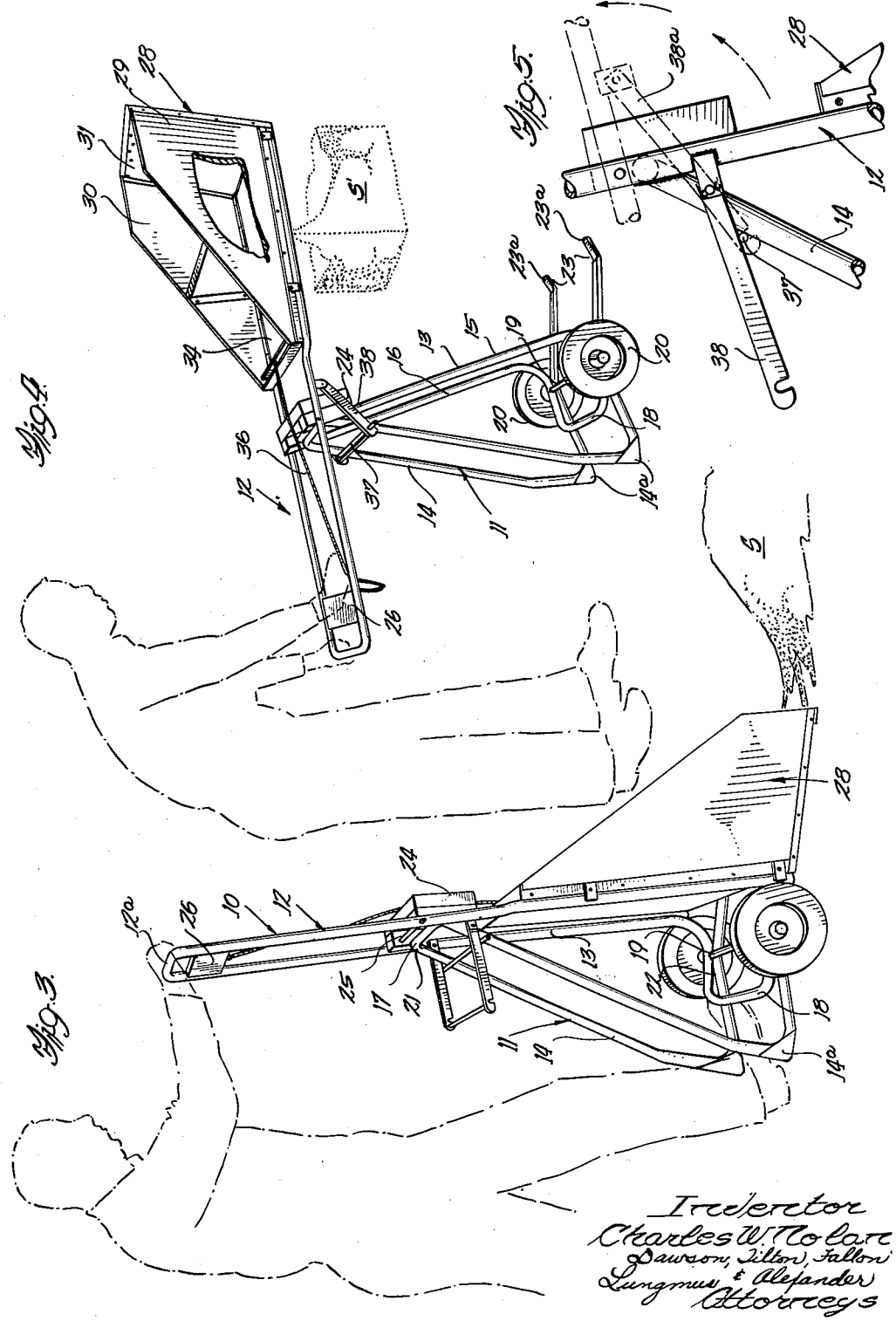
Inventor
Charles W. Nolan
Dawson, Tilton, Fallon
Lungmus & Alexander
Attorneys

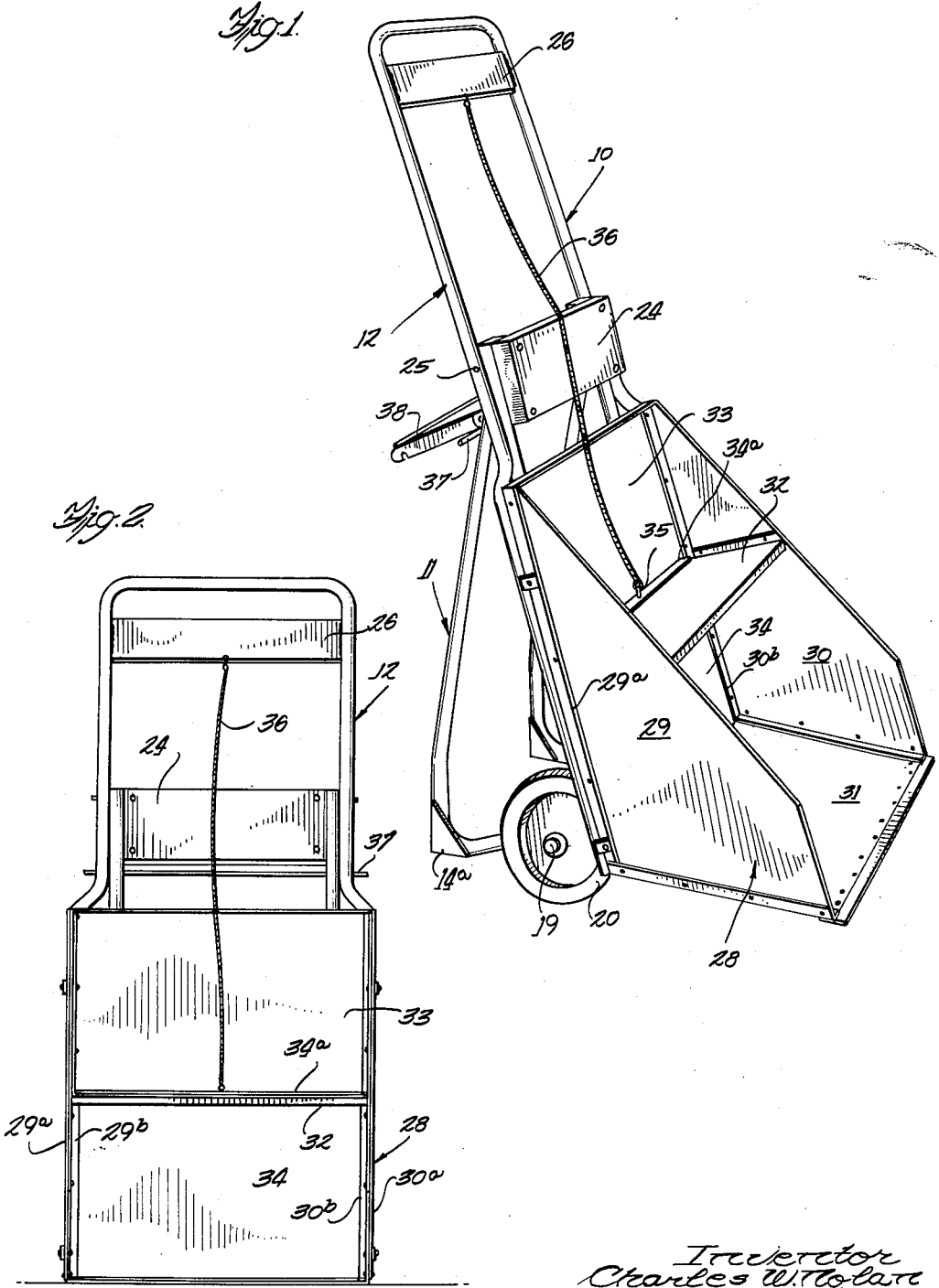

United States Patent Office 3,121,963
Patented Feb. 25, 1964

3,121,963
SHOVELING DEVICE
Charles W. Nolan, Elmhurst, Ill., assignor to
Warren Du Broff, Highland Park, Ill.
Filed Apr. 16, 1962, Ser. No. 187,717
12 Claims. (Cl. 37—53)

This invention relates to a shoveling device, and, more particularly, to a device especially adapted for the shoveling of snow wherein substantial quantities of shoveled material can be relocated with a minimum of physical effort.

It is an object of this invention to provide a novel shoveling device for manual operation, the device being constructed and arranged so that substantial quantities of shoveled material, i.e., snow, can be relocated with a minimum of lifting and bending on the part of the operator.

Another object of the invention is to provide a novel material-handling device featuring a scoop pivotally mounted on a frame wherein the frame is arranged for limited rocking action through a vertical arc, the frame having wheels for ease of relocation of the frame.

Other objects and advantages of the invention may be seen in the details of construction and operation set down in this specification.

The invention will be explained in conjunction with an illustrative embodiment in the accompanying drawing, in which—

FIG. 1 is a perspective view of the device;

FIG. 2 is a front end elevational view of the device of FIG. 1;

FIG. 3 is a perspective view of the device seen in the preceding views but in the operative position corresponding to scooping snow or other granular material, the operator being shown in dotted line;

FIG. 4 is another perspective view of the device but in the operative position wherein the scooped material is being discharged; and FIG. 5 is a fragmentary elevational view of a portion of the device showing the positions of the scoop-equipped subframe corresponding to the showings in FIGS. 3 and 4.

In the illustration given, and with particular reference to FIG. 1, the numeral 10 designates generally the shoveling device of the invention. The device 10 includes a frame designated by the numeral 11, equipped with a subframe generally designated by the numeral 12, the subframe 12 being pivotally related to the frame 11, as can be appreciated from a comparison of FIGS. 3 and 4.

Referring specifically to FIG. 4, it will be seen that the frame 11 is elongated in an upright direction, including a tubular front portion 13 and a tubular rear portion 14. The tubular front portion 13 includes upright elements 15 and 16, which are integrated by cross portions 17 and 18. The forward portion 13 carries an axle 19 at the lower end thereof on which are rotatably mounted wheels 20.

The rear portion 14 is also constructed of tubular stock, and is weldably secured to the front portion 13 at the upper end thereof as at 21 (see FIG. 3). The rearward portion 14 is also secured, as by welding, to the forward portion 13 adjacent the axle 19, as at 22 (again see FIG. 3). Additionally, the rearward portion 14 is equipped with free ends extending beyond the weldment 22 to define a pair of forwardly-projecting members 23 (see FIG. 4).

The upper end of the frame 11 is equipped with a counterweight 24. The counterweight 24 is effective to bias the frame 11 to an equilibrium position where the device 10 is supported on the wheels 20 and the lower ends of the rear portion 14, as at 14a in FIG. 3. The forwardly-projecting members 23 are so constructed as to be slightly above the ground when the frame is in the equilibrium position of FIG. 4. Thus, there is provided a limited rocking action of the frame 11 on the wheels 20—from the equilibrium position where the portions 14a are in contact with the ground, to a forward position, i.e., the shoveling position, where the forward ends of the elements 23 are in contact with the ground. This is illustrated in FIG. 3, where it can be seen that the portions 14a are above the ground. Thus, there is provided a limited rocking action of the frame 11 on the wheels 20, the frame 11 moving through a limited vertical arc.

The subframe 12 is pivotally mounted on the frame 11 by means of the shaft 25. The shaft 25 extends through a portion of the counterweight 24, which in turn is weldably secured to the forward portion 13. At the rear end of the subframe 12 there is provided a counter-weight 26, and at the forward end a scoop generally designated by the numeral 28.

The scoop 28 is seen to include side walls 29 and 30 which are elongated in the direction of the long dimension of the subframe 12. The side walls 29 and 30 are rigidly interconnected by means of a front end wall 31 and by a rear end wall 32. The rear end wall 32, as can be readily appreciated from a consideration of FIG. 1, is positioned intermediate the length of the side walls 29 and 30.

The bottom of the box-shaped scoop is provided in two portions. A first portion 33 interconnects the side walls 29 and 30 at the extreme rearward end of the scoop 28, while the portion between the end walls 31 and 32 is removably closed by a retractable bottom wall 34 equipped with an upstanding flange 34a (see FIG. 1).

The bottom edges of the side walls 29 and 30 are equipped with framing members as at 29a and 30a which cooperate with the inwardly-turned bottom flanges 29b and 30b to define a track for the plate-like openable bottom wall 34. The bottom wall 34, in the upstanding flange portion 34a thereof, is equipped with an eye 35 to which a chain 36 is connected—the rear end of the chain 36 being coupled to the counterweight 26.

The rear portion 14 of the frame 11 is equipped with a transverse rod 37 (see FIGS. 3 and 5). The rod 37 may be weldably secured to the portion 14 adjacent the upper end of the portion 14, and the subframe 12 is equipped with a pivotally mounted latch member 38 to cooperate with the rod 37 in maintaining the subframe 12 in a generally horizontal position as seen in FIG. 4. The latched position of the latch member 38 is seen in dotted line and designated 38a in FIG. 5.

It is believed that a description of the operation of the device will be helpful to an understanding of the invention, and, for that purpose, the following is set down:

*Operation*

In the operation of the device 10, the shoveler can be readily wheeled from place to place when it is in the condition seen in FIG. 1. There, the wheels 20 engage the ground or other shoveling surface, with both the scoop 28 and the resting portions 14a clearing the ground. As an area to be shoveled is approached (see FIG. 3), the device 10 is tilted slightly forwardly so as to dispose the scoop 28 against the ground so as to engage the snow pile S. The device 10 is further advanced forwardly on the wheels 10 until the scoop 28 is loaded. During this time, the operator may apply foot pressure to the tubular portion 18 to enhance the advancement of the scoop 28. Also during this time, a slight manual pressure against the upper end 12a of the subframe 12 overcomes the tendency of the counterweight 24 to pivot the device 10 in a counterclockwise fashion (i.e., rearwardly), so that the operator is subject to relatively little exertion. Once the scoop has been loaded with snow or other material to be relocated, the subframe 12 is now pivoted to the horizontal position seen in FIG. 4, wherein the latch member 28 engages the cross rod 37 to maintain this particular configuration of parts. Thereupon, the device 10 can be wheeled to a dumping site, and when the same is reached, the chain 36 is retracted as seen in FIG. 4 to simultaneously retract the openable wall 34 (seen in retracted position in FIG. 4). This results in the depositing of the load as indicated schematically in FIG. 4 and designated by the symbol S'.

For commencing another shoveling operation, the subframe 12 is returned to the FIG. 3 configuration wherein the subframe 12 is generally vertically disposed, and which coincidentally drops or extends the openable wall 34 to its closed position—under the influence of gravity—the upwardly extending flange 34a abutting the rear end wall 32 to limit the extent to which the openable bottom wall 34 slides downwardly.

The counterbalancing of the subframe 12 as at 26 also aids in limiting the amount of manual pressure that has to be applied to the subframe 12 to convert it from the generally vertical orientation in FIG. 3 to the generally horizontal configuration in FIG. 4. However, during the actual shoveling operation, the counterweight 26 is substantially above the wheels 20 and therefore does not constitute a weight to be supported by the operator. Further, the tendency of the counterweight 26 to pivot downwardly in going from the FIG. 3 to the FIG. 4 configuration is effectively limited by the pivotally-mounted latch member 38 cooperating with the latching rod 37.

As the scoop 28 descends to the shoveling position after discharge—accompanying the clockwise movement as would be the case in the illustration given—of the subframe 12, the scoop 28 comes to rest against the angularly upwardly-extending flattened end portions 23a of the members 23.

While in the foregoing specification I have set down a detailed description of an embodiment of the invention for the purpose of illustration thereof, many variations in the details herein given may be made by those skilled in the art without departing from the spirit and scope of the invention.

I claim:
1. A snow removal device, comprising
 (A) an elongated frame,
 (B) wheel means mounted at one end of said frame,
 (C) an elongated subframe pivotally mounted at the other end of said frame intermediate the subframe ends,
  (1) a counterweight at one end of said subframe, and
  (2) a trapdoor-equipped scoop at the other end of said subframe, said frame and subframe being equipped with releasable interlocking means for maintaining said subframe in a generally horizontal position when said frame is generally vertically oriented.

2. The structure of claim 1 in which said frame and subframe are equipped with releasable interlocking means for maintaining said subframe in a generally horizontal position when said frame is generally vertically oriented.

3. The structure of claim 1 in which said scoop is equipped with guide means slidably supporting said trapdoor for movement generally parallel to the length of said subframe whereby said trapdoor is adapted to descend by gravity to a closed position when said subframe is oriented vertically with said scoop lowermost.

4. In a shovelling device,
 (A) an upright frame having a pair of wheels at the lower end thereof for advancing said frame along the ground in a generally upright condition,
 (B) said frame being equipped with portions extending forwardly and rearwardly adjacent said lower end for limiting the movement of said frame through a vertical arc,
 (C) an elongated subframe mounted on the upper end of said frame intermediate the subframe ends for pivotal movement over a vertical arc from a generally vertical position to a generally horizontal position,
 (D) a counterweight on the rearward end of said subframe, and
 (E) a scoop on the forward end of said subframe, said scoop having an openable wall with said openable wall being disposed at the bottom of said scoop when said subframe is disposed generally horizontally.

5. The structure of claim 4 in which said scoop is equipped with a pair of guides disposed on opposite sides thereof and defining a track for said openable wall, and chain means connecting said openable wall with said rearward end whereby said chain means is manually operative to slide said openable wall to an open position to discharge contents of said scoop.

6. The structure of claim 4 in which said scoop is generally box-shaped, being defined by rigidly interconnected side and end walls, said openable wall providing the bottom of said box shape, said side walls being extended beyond the rearward end of said box shape to provide a track for the retraction of said openable wall.

7. The structure of claim 6 in which said openable wall is equipped with an upstanding flange at the rearward end thereof to limit the movement of said openable wall toward a closed position.

8. In a device of the character described,
 (A) an upright frame,
  (1) an axle on the lower end of said frame equipped with wheels for advancing said frame along the ground,
  (2) said frame having a portion extending rearwardly of said axle at the lower end thereof,
  (3) a counterweight adjacent the upper end of the frame operative to bias said frame to an equilibrium position wherein said frame is supported on said wheels and said rearwardly-extending portion,
 (B) said frame having a second portion extending forwardly of said axle at the lower frame end, with said second portion disposed above the ground when said frame is in said equilibrium position and thereby permitting limited movement of said frame through a vertical arc,
 (C) an elongated subframe mounted on the upper end of said frame intermediate the subframe ends for pivotal movement over a vertical arc from a generally vertical position to a generally horizontal position,
 (D) a counterweight on the rearward end of said subframe, and
 (E) a scoop on the forward end of said subframe, said scoop having an openable wall with said openable wall being disposed at the bottom of said scoop when said subframe is disposed generally horizontally.

9. The structure of claim 8 in which said second portion includes a pair of spaced-apart, forwardly-extending members.

10. The structure of claim 9 in which said members are equipped with flattened forward ends for supporting said scoop and restricting the arcuate movement of said subframe.

11. In a device of the character described,
 (A) an upright frame,
  (1) an axle on the lower end of said frame equipped with wheels for advancing said frame along the ground,
  (2) said frame having a portion extending rearwardly of said axle at the lower end thereof,
  (3) a counterweight adjacent the upper end of the frame operative to bias said frame to an equilibrium position wherein said frame is supported on said wheels and said rearwardly-extending portion, (B) said frame having a second portion extending forwardly of said axle at the lower frame end, with said second portion disposed above the ground when said frame is in said equilibrium position and thereby permitting limited movement of said frame through a vertical arc, (C) an elongated subframe mounted on the upper end of said frame intermediate the subframe ends for pivotal movement over a vertical arc from a generally vertical position to a generally horizontal position, (D) a counterweight on the rearward end of said subframe, and (E) a box-shaped scoop on the forward end of said subframe, said scoop having side walls extending lengthwise of said subframe and defining a longitudinally-extending track, a bottom wall slidably mounted in said track, and end walls on said scoop, one end wall positioned at the forward end of said subframe and engageable with said second portion in one arcuate position of said subframe, the other end wall extending between and connecting said side walls intermediate the side wall ends.

12. In a device of the character described,
(A) an upright frame,
   (1) an axle on the lower end of said frame equipped with wheels for advancing said frame along the ground,
   (2) said frame having a portion extending rearwardly of said axle at the lower end thereof,
(C) a counterweight adjacent the upper end of the frame operative to bias said frame to an equilibrium position wherein said frame is supported on said wheels and said rearwardly-extending portion,
(B) said frame having a second portion extending forwardly of said axle at the lower frame end, with said second portion disposed above the ground when said frame is in said equilibrium position and thereby permitting limited movement of said frame through a vertical arc, (C) an elongated subframe mounted on the upper end of said frame intermediate the subframe ends for pivotal movement over a vertical arc from a generally vertical position to a generally horizontal position, (D) a counterweight on the rearward end of said subframe, (E) a box-shaped scoop on the forward end of said subframe, said scoop having side walls extending lengthwise of said subframe and defining a longitudinally-extending track, a bottom wall slidably mounted in said track, and end walls on said scoop, one end wall positioned at the forward end of said subframe and engageable with said second portion in one arcuate position of said subframe, the other end wall extending between and connecting said side walls intermediate the side wall ends, and (F) latching means interconnecting said frame and subframe for maintaining said subframe in a generally horizontal position.

References Cited in the file of this patent
UNITED STATES PATENTS

| | | |
|---|---|---|
| 729,266 | Brenzinger | May 26, 1903 |
| 2,441,449 | Shaw | May 11, 1948 |
| 2,506,139 | Crosley | May 2, 1950 |
| 2,895,238 | Long | July 21, 1959 |
| 2,932,103 | Wright | Apr. 12, 1960 |

FOREIGN PATENTS

| | | |
|---|---|---|
| 1,059,773 | Germany | June 18, 1959 |